United States Patent [19]
Winter et al.

[11] Patent Number: 6,043,784
[45] Date of Patent: Mar. 28, 2000

[54] ANTENNA LENS IN PARTICULAR FOR A MOTOR VEHICLE RADAR SYSTEM

[75] Inventors: Klaus Winter, Schwieberdingen; Herbert Olbrich, Rutesheim, both of Germany

[73] Assignee: Robert Bosch GmbH, Stuttgart, Germany

[21] Appl. No.: 09/139,830

[22] Filed: Aug. 25, 1998

[30] Foreign Application Priority Data

Aug. 27, 1997 [DE] Germany .................. 197 37 292

[51] Int. Cl.$^7$ .................. H01Q 19/06; H01Q 15/02

[52] U.S. Cl. .................. 343/753; 343/910; 343/911 R

[58] Field of Search .................. 343/711, 786, 343/840, 909, 910, 911 R, 911 L

[56] References Cited

U.S. PATENT DOCUMENTS

| | | | |
|---|---|---|---|
| 3,317,911 | 5/1967 | Stahler et al. | 343/911 R |
| 3,656,165 | 4/1972 | Walter et al. | 343/754 |
| 3,886,561 | 5/1975 | Beyer | 343/910 |
| 4,109,253 | 8/1978 | Chu | 343/909 |

*Primary Examiner*—Hoanganh Le
*Assistant Examiner*—Tan Ho
*Attorney, Agent, or Firm*—Kenyon & Kenyon

[57] ABSTRACT

An antenna lens, in particular for a motor vehicle radar system, has in a plane perpendicular to the optical axis of the antenna lens at least a first and a second lens region, the lens regions being configured such that electromagnetic waves are concentrated or scattered in a first manner upon passage through the first lens region and in a second manner upon passage through the second lens region. The lens regions have different polarization-dependent permeabilities for electromagnetic waves. A motor vehicle radar system having an antenna lens of this kind is also described.

10 Claims, 3 Drawing Sheets

ANTENNA LENS IN PARTICULAR FOR A MOTOR VEHICLE RADAR SYSTEM

FIELD OF THE INVENTION

The present invention relates to an antenna lens, in particular for a motor vehicle radar system. Furthermore, the present invention relates to a motor vehicle radar system having an antenna arrangement which includes a lens.

BACKGROUND INFORMATION

Radar systems or general distance sensors which are mounted in or on a motor vehicle and are utilized, for example, in the context of a distance warning system or an adaptive vehicle speed control system, are now known from numerous publications, for example, International Patent Application No. WO 91/09323 ("the document"). Such systems can, for example as in the document, be implemented as microwave systems, or alternatively or additionally can be based on light waves. The document proposes a radar system having an antenna arrangement whose opening angle is preferably variable as a function of the vehicle's speed. According to the document, the need for such a feature arises from the fact that the observation region of such a radar system, and thus the opening angle of its antenna arrangement, should be broader in city traffic (and thus at lower speeds) than, for example, on an expressway. The disadvantage of a generally very broad opening angle lies, according to the document, in the higher costs associated therewith. The disadvantage of too narrow an opening angle lies in the fact that, in particular, targets which are located at a short distance laterally from the distance sensor cannot be detected and are thus overlooked. The arrangement described in the document allows alternation between a broad and a narrow observation region, but the two can only be set alternatively to one another in each case. It is a further disadvantage the fact that the manner in which the object of the document is achieved requires that changes be made to the antenna arrangement itself during operation of the radar system. Since, however, the accuracy requirements for adjustment of such an antenna arrangement are extremely high in the frequency range used (currently about 77 GHz), each action upon or modification to the antenna arrangement may be expected to cause degradation from an optimum setting.

U.S. Pat. No. 4,769,646 describes an antenna system having an antenna lens that, in combination with two feed elements, simultaneously constitutes a broad and a narrow antenna beam. A broader spatial or angular region is observable with the broad antenna beam, and a narrow spatial or angular region with the narrow antenna beam. The antenna arrangement is carried out in that the antenna lens has multiple lens regions which are configured so that electromagnetic waves are more strongly, more weakly concentrated or scattered as they pass through the respective lens region. With the arrangement described here, however, the possibility cannot be ruled out that signal components which derive from target reflections from the broader observation region of the broader antenna beam will also be received by the feed element which is provided in order to constitute the narrow antenna beam, and vice versa. This necessarily leads to misinterpretations in the assessment of the environmental situation received by the radar system. In technical terms, the two feed elements with their different observation regions are not completely decoupled from one another.

SUMMARY OF THE INVENTION

An object of the present invention is to provide for an antenna lens which, in combination with at least two feed elements, constitutes at least two antenna beams of different widths and moreover exhibits improved decoupling between the antenna beams of different widths. It is also an object of the present invention to provide a motor vehicle radar system which possesses two differently configured observation regions that are very well decoupled from one another.

The object is achieved, according to the present invention, in that an antenna lens, having at least two lens regions which concentrate with different intensities, is configured so that the lens regions have different polarization-dependent permeabilities for electromagnetic waves. The object is further achieved in that a radar system possesses an antenna arrangement comprising at least two feed elements and the antenna lens according to the present invention, at least two of the feed elements being constituted so that they have preferred polarization directions which differ from one another.

An advantage of the antenna lens and a motor vehicle radar system having this antenna lens according to the present invention, is that the at least two observation regions of different widths are very well decoupled from one another. This prevents a target reflection from one observation region from being allocated to another observation region and thus to another position in space. This kind of incorrect allocation of target reflections would lead to false targets and thus to a misinterpretation of the prevailing traffic situation. In contrast to those systems which use separate antennas for different observation regions, this radar system according to the present invention nevertheless has a compact configuration. The antenna lens according to the present invention does not require a greater production outlay than for conventional antenna lenses. Nor is a particular mechanical design necessary for the antenna arrangement, so that overall, the outlay for the production and assembly of a motor vehicle radar system according to the present invention is not increased, despite an expanded range of functions as compared to conventional systems.

DETAILED DESCRIPTION

Figure 1A:
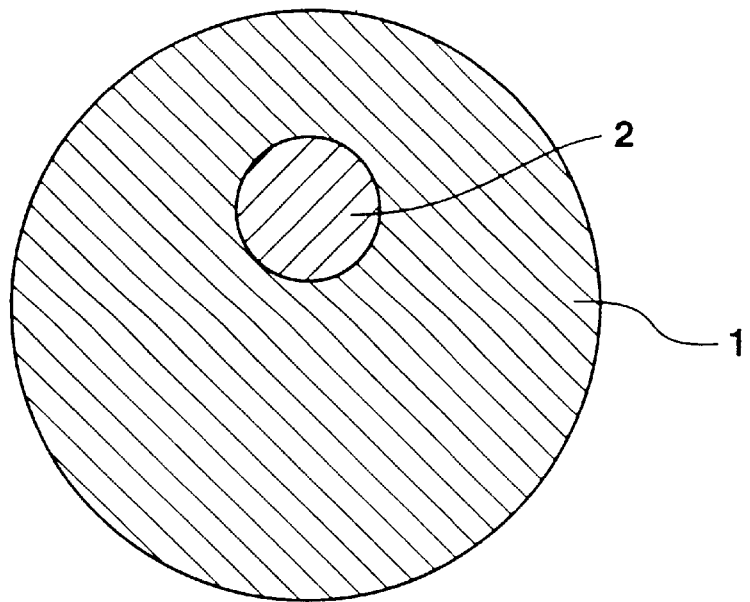
FIG. 1a shows an exemplary embodiment of an antenna lens according to the present invention in a plan view.

FIG. 1a shows a plan view of an antenna lens according to the present invention which has a first lens region 1 and a second lens region 2. According to a preferred exemplary embodiment of the present invention, the second lens region is at least partly, and here completely, surrounded by the first lens region. First lens region 1 determines the external lateral dimensions of the overall antenna lens and has an opening in which second lens region 2 is arranged. According to the present invention, the two lens regions 1, 2 have different polarization-dependent permeabilities for electromagnetic waves. This is indicated by the cross-hatching that is mutually offset by 90 degrees. If the antenna lens is configured, for example, as a metal plate lens, the different polarization-dependent permeability can be achieved using correspondingly differently oriented metal plates. In the case of a plastic or ceramic lens, the different polarization-dependent permeability can be achieved, for example, by introducing polymer films or carbon fibers into or onto the lens elements; their molecular or fiber structure must then have the desired polarization-dependent preferred directions.

As will be explained in detail below, lens region 1 constitutes, in conjunction with the feed elements associated with it, antenna beams which have a relatively narrow opening angle. Lens region 2 constitutes, in conjunction with the feed elements associated with it, antenna beams which have a wider opening angle. In the case of a motor vehicle radar system, lens region 1 is accordingly provided in order to constitute a relatively narrow observation region, and lens region 2 to constitute a broader observation region. The narrower observation region is used in particular on expressways for observation ranges up to, for example, 150 meters. The broader observation region is used in particular in "stop-and-go" traffic, i.e. in city traffic or in a traffic jam. Since conventional motor vehicle radar systems are designed so that they observe the narrower remote region, they generally possess an antenna lens whose external lateral dimensions correspond to those of lens region 1. With this preferred exemplary embodiment, the lens according to the present invention as depicted in FIG. 1*a* is not enlarged by comparison with the conventional antenna lenses. In contrast to the exemplary embodiment shown, however, lens region 2 can also, for example, be arranged at the edge of lens region 1, i.e. as if two independent antenna lenses had been fitted together.

Figure 1B:
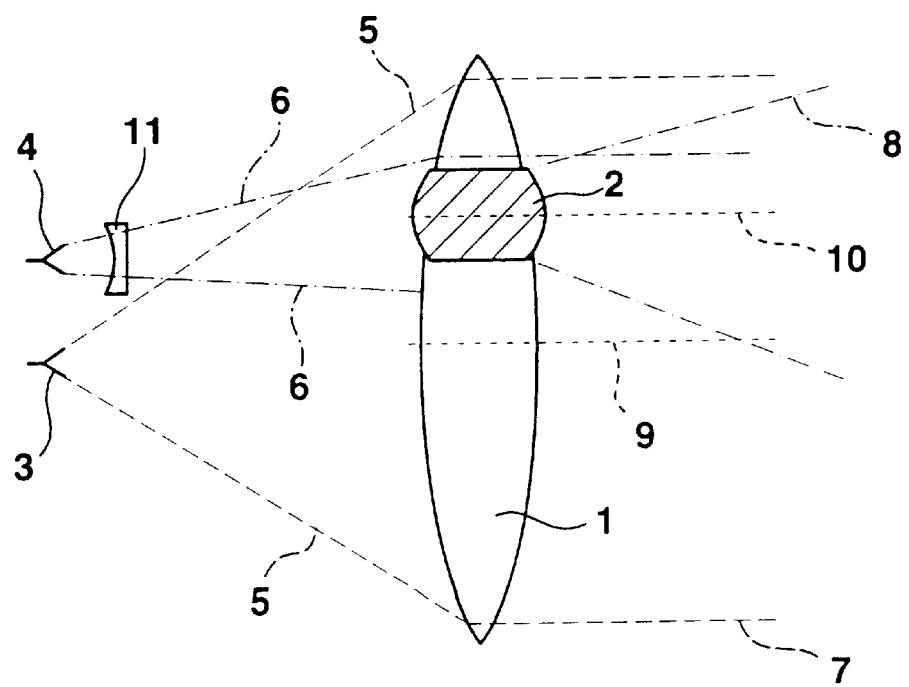
FIG. 1b shows an exemplary embodiment of an antenna lens according to the present invention in a cross-sectional view.

FIG. 1*b* shows the antenna lens according to FIG. 1*a* in a cross-sectional view. The two lens regions 1 and 2 are evident. FIG. 1*b* also shows an optical axis 9 of lens region 1 and the optical axis 10 of lens region 2. The two run parallel but, in the exemplary embodiment, at an offset from one another. It is theoretically also possible, however, for optical axes 9 and 10 of the two lens regions 1 and 2 to coincide. Indicated by way of example as 3 and 4 are feed elements which, together with the antenna lens, constitute an antenna arrangement. Two V-shaped diverging lines 5 indicate a beam path in which electromagnetic waves which are excited by feed element 3 propagate in the direction of the antenna lens. The two V-shaped lines 6 indicate the beam path in which electromagnetic waves excited by feed element 4 propagate in the direction of the antenna lens. Beam path 5 is in this case broader than beam path 6, and ideally illuminates the entire lens region 1 without radiating beyond it. This can be achieved, if applicable, using suitable prefocusing elements in combination with feed element 3. To achieve the narrower beam path 6, a prefocusing lens 11 is indicated between feed element 4 and the antenna lens. Alternatively, this can also, for example, be configured in the form of "polyrods," or can be replaced or supplemented by focusing features on feed element 4 itself.

Beam path 6 is selected to be narrow so that its illumination coverage of lens region 2 is as precise as possible, while beam path 5 illuminates the entire lens region 1. As indicated in FIG. 1*b*, however, a spillover of beam path 6 beyond lens region 2 cannot be completely prevented. Thus, electromagnetic waves which are excited by feed element 4 pass for the most part through lens region 2, but an unavoidable proportion also pass through lens region 1. Conversely, because of the broader beam path 5, electromagnetic waves which are excited by feed element 3 also illuminate lens region 2. The focusing effect of lens regions 1 and 2 is, as described above, of different intensities. This be achieved, for example, using different materials and/or a different configuration of the pass through surfaces of the lens regions. In the preferred exemplary embodiment, electromagnetic waves which pass through lens region 1 are more strongly concentrated, while electromagnetic waves which pass through lens region 2 are more weakly concentrated. This is indicated by the extended beam paths 7 and 8. Decoupling of feed elements 3 and 4 from one another is achieved in that the two lens regions 1 and 2, as described above, have different polarization-dependent permeabilities for electromagnetic waves. In this context, the feed elements must be adapted to the respective polarization-dependent preferred direction of lens regions 1 and 2. This is discussed in even further detail with reference to the subsequent FIG. 2.

The lenses according to the present invention as shown in FIGS. 1*a* and 1*b* are preferably used in a motor vehicle radar system. Using the schematically rendered feed element 3, there is formed in conjunction with lens region 1 an antenna beam which has a relatively narrow opening angle and is thus used to observe a remote region of, for example, up to 150 meters. An antenna beam which possesses a broader opening angle and with which a close-in region of the radar system of, for example, up to 20 meters is observed, is formed via feed element 4 in conjunction with prefocusing lens 11 and lens region 2. A signal reflection from the remote region which has a sufficient signal strength at feed element 4 would be allocated by a downstream signal processing system to the close-in region. Conversely, a target reflection from the close-in region which reaches feed element 3 with sufficient signal strength would be allocated by the downstream signal processing system to the remote region. These incorrect allocations can now be suppressed by the different polarization-dependent permeabilities of the two lens regions in conjunction with different polarization-dependent preferred directions of the feed elements.

Figure 2:
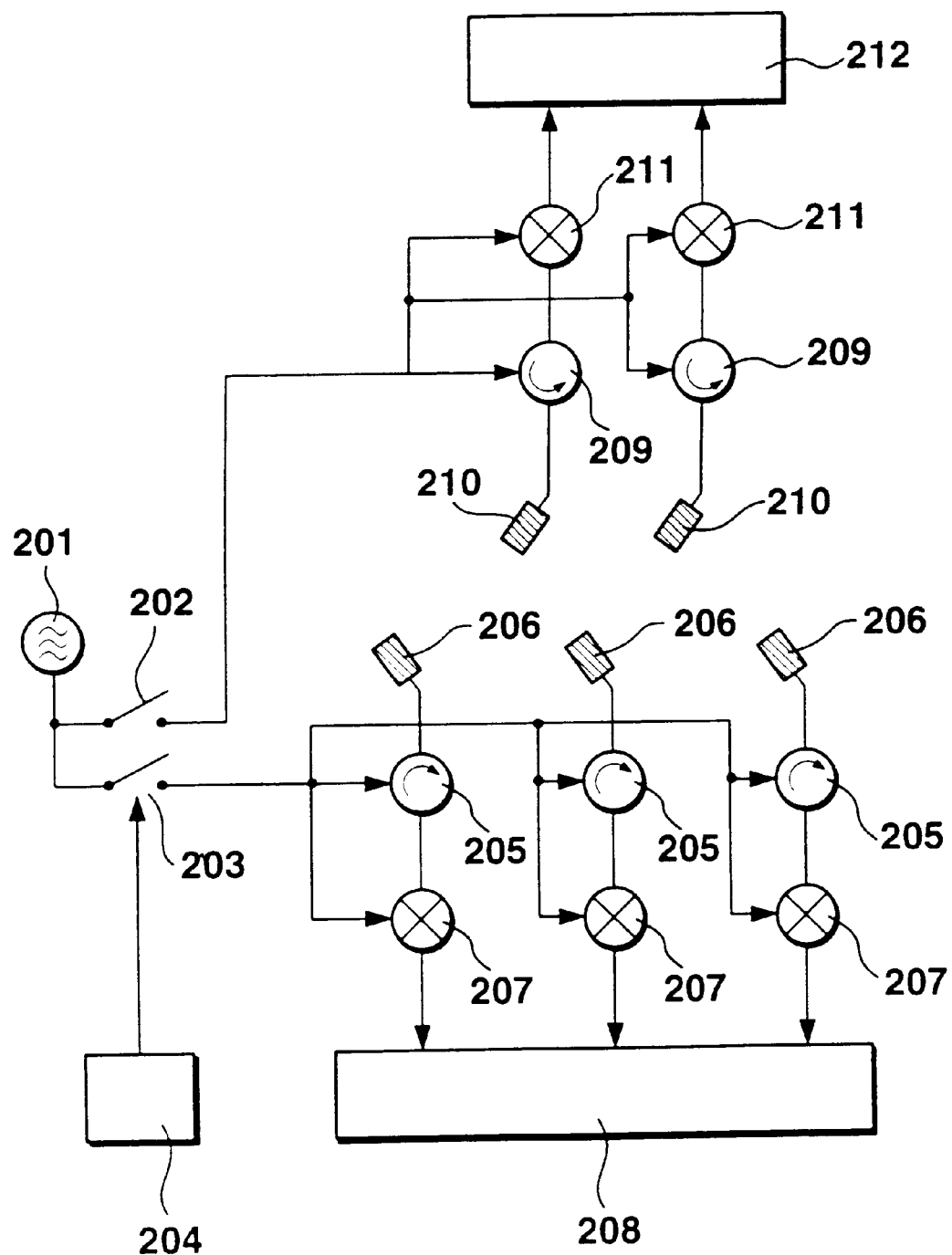
FIG. 2 shows a basic circuit diagram of a motor vehicle radar system according to the present invention.

FIG. 2 shows a schematic block diagram of a radar system according to the present invention. The radar system is, as is often preferred for the present invention, conceived as a FMCW radar system. A pulse radar or a distance sensor based on light waves could also, however, just as well be used here. The radar system includes an oscillator 201 which is connected via two switches 202 and 203 to two separate signal receiving and sending circuits. Oscillator 201 generates frequency-modulated transmitted signals corresponding to the FMCW principle, which are conveyed via switch 203 to transmit/receive splitters 205 and to receiving mixers 207. The transmitted signals are conveyed via transmit/receive splitters 205 to feed elements 206 which are preferably embodied as patch elements. To achieve a polarization-dependent preferred direction, the patch elements are of rectangular configuration and are arranged so that in the exemplary embodiment shown here, a polarization-dependent preferred direction of 45 degrees to the left is created. A signal reflection received via feed elements 206 is conveyed via transmit/receive splitters 205 to receiving mixers 207. There the received signals are mixed with the respective instantaneous transmitted signals of transmitting oscillator 201. The differential frequencies resulting from mixing are then analyzed in a signal processing unit 208.

According to a preferred exemplary embodiment of a radar system according to the present invention, three feed elements, three transmit/receive splitters 205, and three receiving mixers 207 are respectively provided in this transmit/receive circuit. Using a method described, for example, in International Patent Application No. WO 97/20229, the angular position of a detected radar target can be determined. In addition to the first transmit/receive circuit described here, oscillator 201 is connected via switch 202 to a second transmit/receive circuit. The latter is configured in just the same way as the first transmit/receive circuit described previously, but possesses only two feed elements 210, transmit/receive splitters 209, and receiving mixers 211, respectively. The signals of receiving mixers 211 are conveyed to an analysis circuit 212. According to the present invention, feed elements 210 are configured at a 90-degree inclination with respect to feed elements 206. Feed elements 206 and 210 thus have preferred polarization directions which are configured differently from one another. In the case of the preferred radar system according to the present invention, analysis unit 208 is provided to analyze target reflections from the remote region, and analysis unit 212 to analyze target reflections from the close-in region.

The transmit/receive circuits can be activated separately from one another using switches 202, 203 and a control unit 204. If they are put into operation alternately with one another, this offers the advantage that the transmitting power of oscillator 201 is completely available to the respective transmit/receive circuit. If the two transmit/receive circuits are operated simultaneously, with this exemplary embodiment the generated transmitting power of oscillator 201 is split between the two transmit/receive circuits. Each of the two transmit/receive circuits could also be fed from a separate oscillator 201. In the case of the radar system according to the present invention, the antenna lens according to the present invention (not shown in FIG. 2) defined by FIGS. 1a and 1b is located above the arrangement constituted by feed elements 206 and 210. With the preferred exemplary embodiment of the radar system according to the present invention, feed elements 210 illuminate lens region 2, and feed elements 206 illuminate lens region 1.

Figure 3:
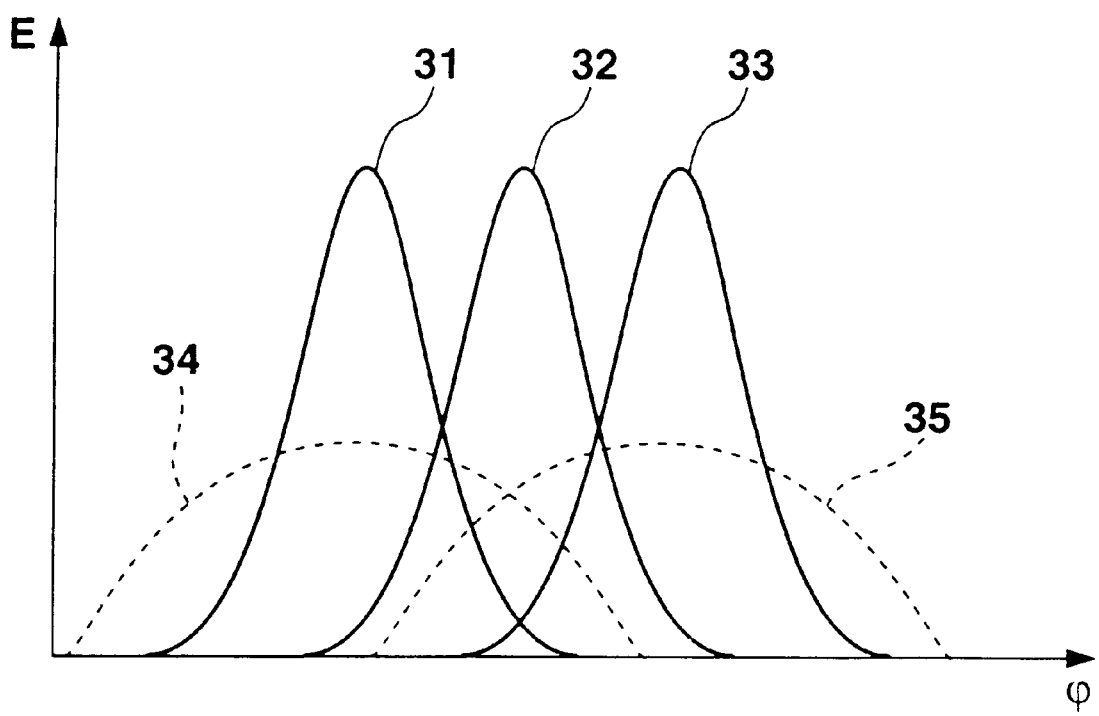
FIG. 3 shows a schematic depiction of an antenna diagram of the motor vehicle radar system according to the present invention.

FIG. 3 schematically shows an antenna diagram of the radar system according to the present invention in Cartesian coordinates. An azimuth angle ψ is plotted on the abscissa, and a receiving level E on the ordinate. The antenna diagram shows three more-strongly concentrated antenna beams 31, 32, and 33 which are formed by feed elements 206 in conjunction with lens region 1. Two more-weakly concentrated antenna beams 34 and 35 are formed by feed elements 210 in conjunction with lens region 2. Each real antenna diagram additionally possesses numerous sidelobes, but they are not shown here. Antenna beams 34 and 35 achieve a lower maximum value than antenna beams 32 and 33. This corresponds to the design of the radar system such that antenna beams 34 and 35 and feed elements 210 connected therewith are intended to observe the close-in region at a distance up to, for example, 20 meters, while a remote region up to, for example, 150 meters is to be observed with antenna beams 31, 32, and 33. The dashed lines of antenna beams 34 and 35 indicate that almost no signal level is received by way of them if the polarization direction is selected so that antenna beams 31, 32, and 33 assume their maximum sensitivity. Thus, the two observation regions are decoupled from one another. Thus, in one embodiment, at a first polarization, a first polarization-dependent permeability of the first lens region 1 is equal to a maximal predetermined value and a second polarization-dependent permeability of the second lens region 2 is equal to a minimal predetermined value. At a second polarization, the first polarization-dependent permeability is equal to the minimal predetermined value and the second polarization-dependent permeability is equal to the maximal predetermined value.

What is claimed is:

1. An antenna lens, comprising:
   a first lens region configured so that electromagnetic waves are one of concentrated and scattered in a first manner upon passage through the first lens region, the first lens region having a first polarization-dependent permeability for the electromagnetic waves; and
   a second lens region configured so that the electromagnetic waves are one of concentrated and scattered in a second manner upon passage through the second lens region, the second lens region having a second polarization-dependent permeability for the electromagnetic waves, the second polarization-dependent permeability being different from the first polarization-dependent permeability,
   wherein the first lens region and the second lens region are situated in a plane perpendicular to an optical axis of the antenna lens.

2. The antenna lens according to claim 1, wherein a motor vehicle radar system includes the antenna lens.

3. The antenna lens according to claim 1, wherein the second lens region is at least partly surrounded by the first lens region.

4. An antenna lens, comprising:
   a first lens region configured so that electromagnetic waves are one of concentrated and scattered in a first manner upon passage through the first lens region, the first lens region having a first polarization-dependent permeability for the electromagnetic waves; and
   a second lens region configured so that the electromagnetic waves are one of concentrated and scattered in a second manner upon passage through the second lens region, the second lens region having a second polarization-dependent permeability for the electromagnetic waves, the second polarization-dependent permeability being different from the first polarization-dependent permeability,
   wherein the first lens region and the second lens region are situated in a plane perpendicular to an optical axis of the antenna lens, and wherein, at a first polarization, the first polarization-dependent permeability is equal to a maximal predetermined value and the second polarization-dependent permeability is equal to a minimal predetermined value and, at a second polarization, the first polarization-dependent permeability is equal to the minimal predetermined value and the second polarization-dependent permeability is equal to the maximal predetermined value.

5. The antenna lens according to claim 4, wherein the first lens region determines lateral external dimensions of the antenna lens and wherein the second lens region is arranged in an opening of the first lens region.

6. An antenna lens, comprising:
   a first lens region configured so that electromagnetic waves are one of concentrated and scattered in a first manner upon passage through the first lens region, the first lens region having a first polarization-dependent permeability for the electromagnetic waves; and
   a second lens region configured so that the electromagnetic waves are one of concentrated and scattered in a second manner upon passage through the second lens region, the second lens region having a second polarization-dependent permeability for the electromagnetic waves, the second polarization-dependent permeability being different from the first polarization-dependent permeability, wherein the first lens region and the second lens region are situated in a plane perpendicular to an optical axis of the antenna lens, wherein the second lens region is at least partly surrounded by the first lens region, and wherein the first lens region brings about a first concentration of the electromagnetic waves and the second lens region brings about a second concentration of the electromagnetic waves, the first concentration being stronger than the second concentration.

7. A motor vehicle radar system including an antenna arrangement, comprising:

at least two feed elements including a first feed element having a first preferred polarization direction and a second feed element having a second preferred polarization direction, the first and second feed elements being configured so that the first preferred polarization direction is different from the second preferred polarization direction; and a beam-forming antenna lens including at least two lens regions perpendicular to an optical axis of the antenna arrangement, the at least two lens regions having a first lens region and a second lens region, the first lens regions being configured so that electromagnetic waves are one of concentrated and scattered in a first manner upon passage through the first lens region and the second lens region being configured so that the electromagnetic waves are one of concentrated and scattered in a second manner upon passage through the second lens region, the first lens region having a first polarization-dependent permeability for the electromagnetic waves and the second lens region having a second polarization-dependent permeability for the electromagnetic waves, the first polarization-dependent permeability being different from the second polarization-dependent permeability.

8. A motor vehicle radar system including an antenna arrangement, comprising:

at least two feed elements including a first feed element having a first preferred polarization direction and a second feed element having a second preferred polarization direction, the first and second feed elements being configured so that the first preferred polarization direction is different from the second preferred polarization direction;

a beam-forming antenna lens including at least two lens regions perpendicular to an optical axis of the antenna arrangement, the at least two lens regions having a first lens region and a second lens region, the first lens regions being configured so that electromagnetic waves are one of concentrated and scattered in a first manner upon passage through the first lens region and the second lens region being configured so that the electromagnetic waves are one of concentrated and scattered in a second manner upon passage through the second lens region, the first lens region having a first polarization-dependent permeability for the electromagnetic waves and the second lens region having a second polarization-dependent permeability for the electromagnetic waves, the first polarization-dependent permeability being different from the second polarization-dependent permeability; and at least five feed elements including at least two feed elements configured in the second preferred polarization direction and at least three feed elements configured in the first preferred polarization direction, the at least three feed elements together with the first lens region constituting at least three more-strongly concentrated main antenna beams, and the at least two feed elements together with the second lens region constituting at least two more-weakly concentrated main antenna beams, wherein the first polarization-dependent permeability is equal to a maximal predetermined value at the first preferred polarization direction and the second polarization-dependent permeability is equal to the maximal predetermined value at the second preferred polarization direction.

9. The motor vehicle radar system according to claim 8, further comprising:

a switching arrangement activating the at least three feed elements and the at least two feed elements together.

10. The motor vehicle radar system according to claim 8, further comprising:

a switching arrangement activating the at least three feed elements and the at least two feed elements alternatively.

* * * * *